April 5, 1955
J. L. COLBY
2,705,443
MEANS FOR CUTTING AND SEALING PLASTIC BAGS
Filed June 4, 1952
4 Sheets-Sheet 1
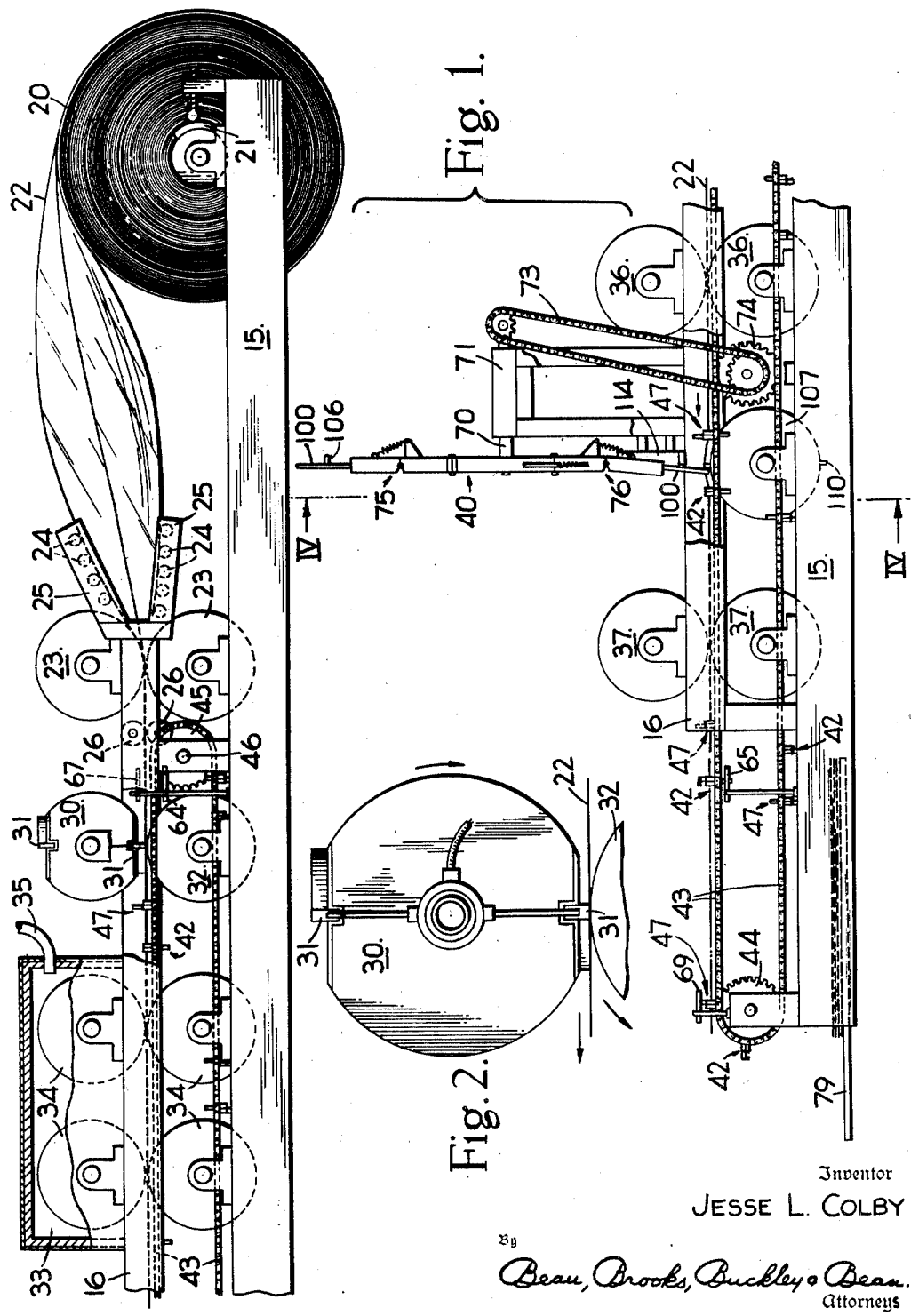
Inventor
JESSE L. COLBY
By
Beau, Brooks, Buckley & Beau.
Attorneys April 5, 1955 J. L. COLBY 2,705,443
MEANS FOR CUTTING AND SEALING PLASTIC BAGS
Filed June 4, 1952 4 Sheets-Sheet 2

Inventor
JESSE L. COLBY
By Bean, Brooks, Buckley & Bean
Attorneys

April 5, 1955   J. L. COLBY   2,705,443
MEANS FOR CUTTING AND SEALING PLASTIC BAGS
Filed June 4, 1952   4 Sheets-Sheet 3
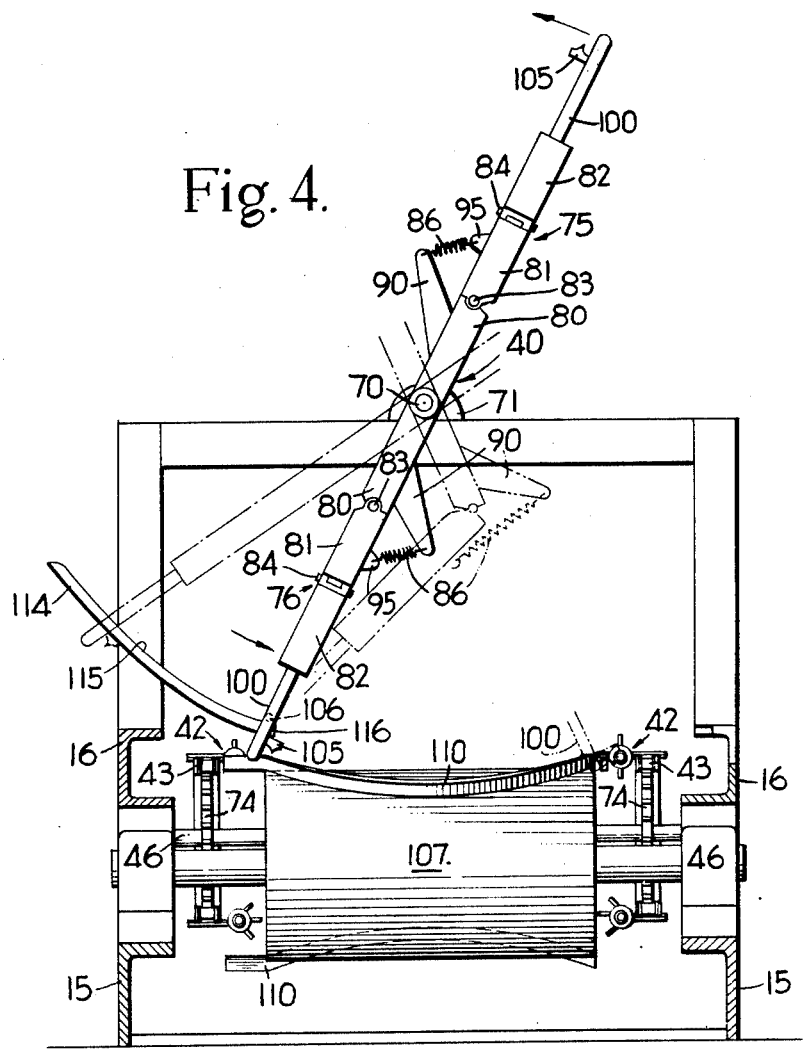
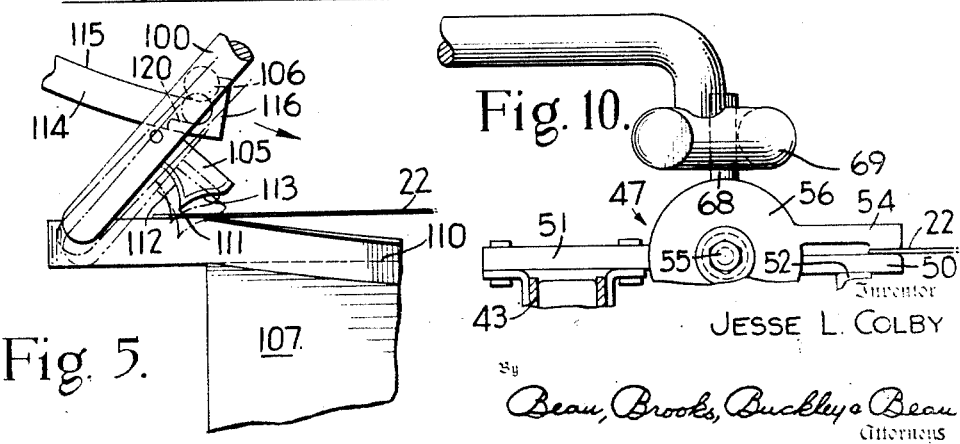
JESSE L. COLBY
Beau, Brooks, Buckley & Beau
Attorneys April 5, 1955    J. L. COLBY    2,705,443
MEANS FOR CUTTING AND SEALING PLASTIC BAGS
Filed June 4, 1952    4 Sheets-Sheet 4

Inventor
JESSE L. COLBY
By
Bean, Brooks, Buckley & Bean
Attorneys

United States Patent Office 2,705,443
Patented Apr. 5, 1955

2,705,443

MEANS FOR CUTTING AND SEALING PLASTIC BAGS

Jesse L. Colby, Lockport, N. Y.

Application June 4, 1952, Serial No. 291,662

13 Claims. (Cl. 93—33)

My invention relates in general to bag making machines, and in particular to machines for making bags made from plastic material of a kind suitable for packaging poultry and the like.

It is well known to those skilled in the art that the plastic material for such bags is usually made by extruding the material in tube form and that in material of this type, one of the problems encountered is the sealing of one end of the portion of material forming the bag. In order to make the wrapper properly fit the contained merchandise, it is essential that the seal at one end of the bag be curve-shaped, and that each portion of the bag be severed from the preceding bag at the forward end of the material. It is further well known that the material suitable for this purpose is very tough and is not easily severed by ordinary cutting methods.

The principal object of my invention is to provide a machine so constructed that perfect seals on the material may be continuously made thereby avoiding interruptions due to intermittent action and frequent machine failure.

Another object is to provide a machine whereby opposite sides of the tubular film of material may be effectively and quickly sealed.

A further object is to provide a machine in which the predetermined lengths of film material may be continuously sealed and cut adjacent the seal of the next succeeding bag.

Furthermore, it is an object to provide a device having cutter means which initially pierce the material preliminary to cutting the same.

Moreover, it is an object to provide means for cooling the sealed joint before the finished bag is severed from the film material.

The above objects and advantages have been accomplished by the device shown in the accompanying drawings, of which:

Fig. 1 is a side elevation in two sections of my complete device;

Fig. 2 is an enlarged view of the sealer roll;

Fig. 4 is a sectional view taken on line IV—IV of Fig. 3 showing the details of the cutter head;

Fig. 5 is an enlarged fragmentary view of the lower portion of one of the cutter arms;

Fig. 10 is a similar view of a different clamping member; and

Figure 3:
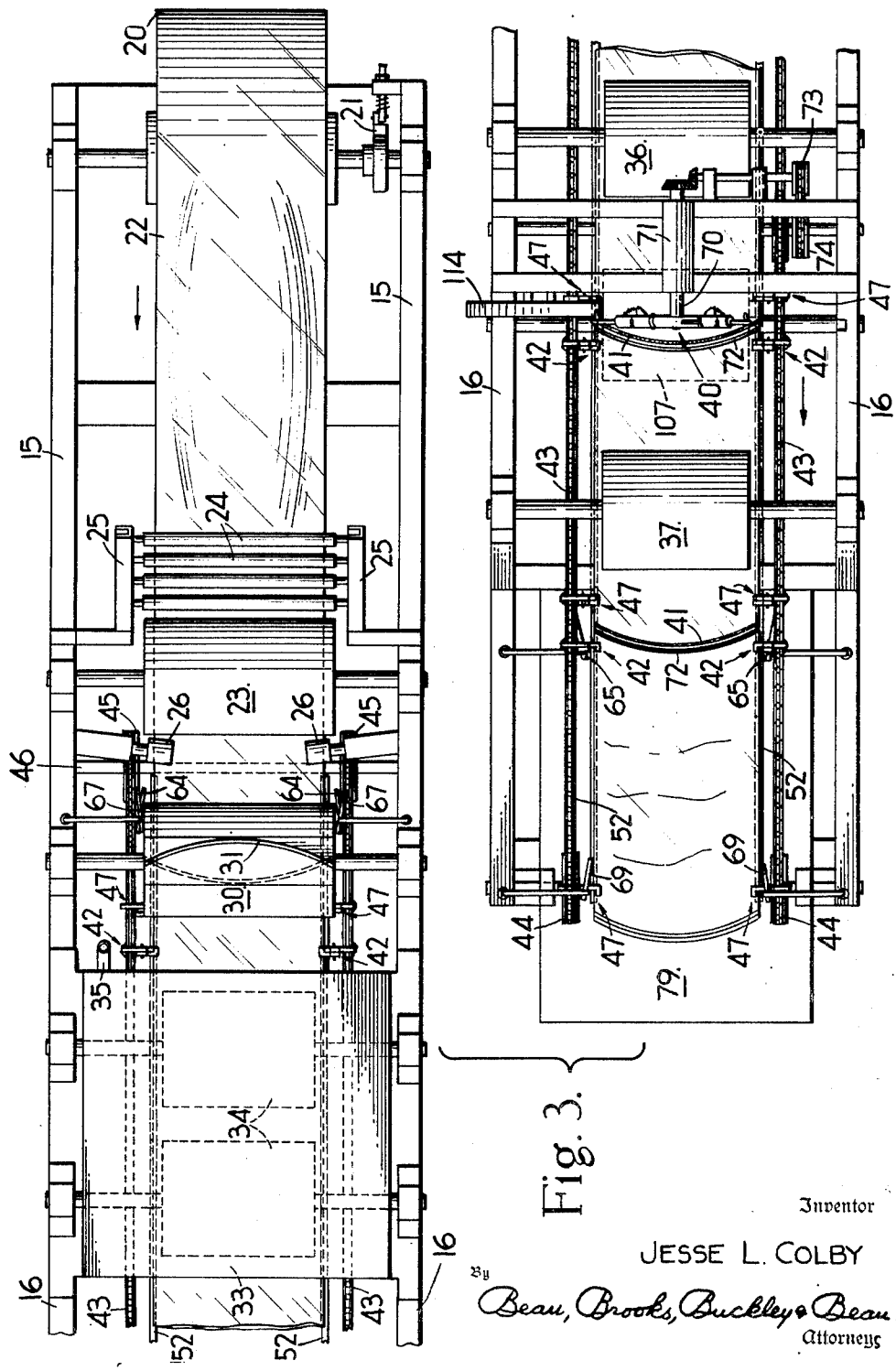
Fig. 3 is a plan view in two sections of the complete device.

My device comprises a bed 15 extending longitudinally of the machine over which a frame 16 is supported in spaced relation therewith. A roll 20 of film material from which individual bags are to be made is rotatably supported at the front end of the bed, and an adjustable brake 21 is provided for producing the desired tension upon the film 22. As heretofore indicated, the film is of plastic material and is preferably made by the process of extrusion, whereby the top and bottom portions are one continuous piece without longitudinal seams. As shown in Figs. 1 and 3, the material is fed from the roll 20 between the squeegee rolls 23 and the supply roll is preferably inflated which serves to separate the top and the bottom portions of the material and to test it for imperfections. The material is preferably run through a series of upper and lower guide rollers 24 carried by suitable framework 25, which gradually compresses the top and bottom portions of the film prior to passage between the squeegee rolls 23. After passing between the squeegee rollers, the edges of the film are passed between tension rollers 26 arranged one at each edge of the film. These rollers are arranged at an angle, as shown in Fig. 3, and they serve to laterally stretch the material so as to make it taut. The material then passes under the sealer roll 30 whereby the top and bottom portions are sealed. The sealer roll, as shown enlarged in Fig. 2, is provided preferably with two sealing units 31 spaced apart 180° and mounted in the periphery of the roll. These units extend from one end of the roll to the other and are heated preferably by electricity which is conducted to the roll in any well known manner. In order to make the wrapper conform more perfectly to the contained merchandise, such as poultry, it is desirable that the sealed end of the bag be curve-shaped, and to this end the sealing units are curved. In order to properly seal the front and back portions of the film together, a backing roll 32 is provided against which the sealing units are pressed and this roll is preferably of rubber or other resilient material.

After the film has been sealed at 41 at predetermined spaced positions, it is carried into and through a cooling chamber 33 which may be provided with one or more sets of cooling rollers 34. This chamber is preferably cooled by cold air supplied through the duct 35, or it may be provided with suitable refrigerated means (not shown).

After passing through the cooling chamber, the film may be passed through another set of feed rollers 36, whence it passes to the cutter head 40 of my device where the film is cut along a line adjacent each of the seals 41. The frame 16 supports suitable bearing blocks for the upper squeegee and feed rolls and for the sealer roll.

In order to conduct the film 22 through the various rollers and to feed it onto and through the cutting head to the place of discharge of the finished bags, I provide a series of spaced clamping members 42 and 47 which are carried by conveyor chains 43 arranged one at each side of the machine and extending longitudinally thereof. The clamping members 42 and 47 are alternately arranged on the chains and serve to grasp the film at positions which represent, respectively, the sealed end and open top of each individual bag when finished. Each chain is supported near the ends of the bed by means of sprocket wheels 44 and 45. The sprocket wheels 45 are mounted upon a shaft 46 which is driven by any suitable means.

Figures 6, 7, 8, 9, 11:
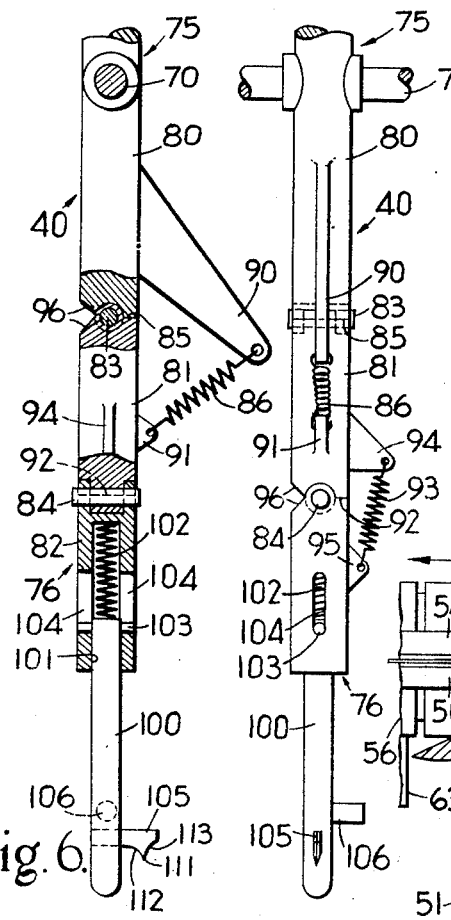
Fig. 6 is an enlarged fragmentary front elevation of one of the cutter arms of the cutter head.
Fig. 7 is a similar view showing the cutter arm of the head in side elevation.
Fig. 8 is an enlarged view showing the cutting means of my device.
Fig. 9 is an enlarged end view of one of the clamping members.
Fig. 11 is a plan view of one of the clamping members.

Each of the clamping members 42, as shown in Figs. 9 and 11, comprises a stationary finger 50 which is carried by an arm 51 that extends outwardly and which is secured to a number of links of one of the chains 43. In order to steady the stationary finger, as it moves along with the chain, a guide rail 52 is provided at each side of the machine which is suitably supported in spaced relation with the edge of the film. Each stationary member is provided with a clamp disc 53 opposite which is pivotally mounted a movable finger 54. The movable finger is pivotally mounted upon a pivot bolt 55 which passes through the clamping disc 53 of the stationary finger and through a similar disc 56 of the movable finger. The disc 53 is formed with a recess 60 having tapered walls, and the disc of the movable finger is formed with a lug 61 having tapered sides for engagement with the recess 60. A helical spring 62 is mounted upon the bolt 55 and serves to force both discs toward each other. As shown in Fig. 11, the lug 61 and engaged recess 60 are so spaced that there is clearance at one side of the lug when the fingers have gripped the film, whereby the spring will urge the fingers toward each other and thereby effectively grip the film. Extending downwardly from the disc 56 of the movable finger of each of the clamping members 42 is an actuating pin 63 which is arranged substantially in perpendicular position when the fingers are gripping the film, as clearly shown in Fig. 9. The pins 63 of the clamping members are designed to engage with suitable closing cams 64 and opening cams 65 at each end of the machine to close the fingers at one end of the film travel and to release them at the other end. The closing cams 64 are inclined so that when being engaged by the actuating pin of the members 42, the clamping disc of the movable finger will be rotated toward the position shown in Figs. 9 and 11. When the lug 61 engages the recess 60, the inclined surfaces thereof will cause the final rotation of the movable finger under the tension of the spring 62 thus securely grasping the edges of the film 22. The fingers will be maintained in their closed position while conducting the finished bag to the position of delivery where the opening cams 65 are located. Engagement of the actuating pin 63 with the cam, as shown in Figs. 9 and 11, will cause the movable fingers 54 to be raised, thus releasing the film. The alternate clamping members 47, shown in Fig. 10, are substantially like the clamping members 42 except that the actuating pin 68 of each is extended upwardly from the disc of the movable finger and engage a closing cam 67 and an opening cam 69 suitably supported by stationary parts of the machine. The closing and opening cams for the clamping members 47 are spaced from the closing and opening cams of the members 42 in such manner that the material will be simultaneously grasped at positions which are near the sealed bottom and the open top of each bag, whereby after each bag has been sealed and severed from the film material it will be carried by these fingers to the place of discharge, where the fingers are opened simultaneously thus releasing the finished bag.

The cutter head 40 of my device is arranged in front of the feed roll 36 and is mounted upon a cutter shaft 70 which is supported by a housing 71. This cutter shaft is driven in synchronism with the movement of the film so that the film is severed along a line 72 immediately in advance and adjacent to each of the seals 41. Any suitable mechanism may be employed for causing this timed rotation of the shaft, and for convenience in the drawing, I have shown a sprocket chain 73 driven by a sprocket wheel 74 which engages the upper and lower passes of one of the sprocket chains 43.

As shown in the drawings, the cutter head 40 is provided with two cutter arms 75 and 76, extending radially from the shaft and in line with each other. Each cutter arm preferably comprises an inner section 80, an intermediate section 81, and an outer section 82. The inner and intermediate sections are pivotally united by a hinge 83 which permits these portions to be angularly arranged in a plane perpendicular to the axis of the cutter shaft. The intermediate and outer sections are likewise united by a hinge 84 which permits these sections to be angularly arranged in a plane parallel to the axis of the shaft. Stop faces 85 are provided at one side of the hinge 83, and these faces are so arranged that when engaged, the inner and intermediate sections 80 and 81 will be held in alignment. In order to keep these sections in alignment and to place the angular movement thereof under tension, I provide a helical spring 86, one end of which is attached to an arm 90 carried by the inner section and the other end of which is attached to a lug 91 carried by the intermediate section. In like manner, the intermediate and outer sections 81 and 82 are pivotally united by means of a hinge 84 and these sections adjacent one side of the hinge are provided with stop faces 92 which are held in engagement by means of a spring 93, having one end attached to an arm 94 carried by the intermediate sections and having its opposite end attached to a lug 95 carried by the outer section. As shown in Figs. 6 and 7, each of the sections adjacent the connecting hinges 83 and 84 is formed with a tapered surface 96 which permits limited angular relation of the sections around the respective hinged joint. The outer section 82 of each cutter arm is formed with a cutter bar 100 which is slidably mounted with a recess 101 formed in the section. A helical spring 102 is disposed on the bottom of the recess 101 and bears against the end of the bar to urge it outwardly. The bar is maintained within the recess and kept from relative rotation with the section by means of a guide pin 103 which passes through the inner end of the bar and which engages opposite slots 104 formed in the wall of the outer section. A cutter 105 is carried by the outer end of the cutter bar and it is spaced some distance from the outer end thereof. A cam pin 106 is also carried by the outer end of the cutter bar and it is in spaced relation with the cutter.

Arranged immediately under the cutter head is the cutter roll 107 which is formed in its periphery with two oppositely arranged guide flanges 110. These flanges serve to guide the path of each cutter 105 in its cutting operation, and it is, therefore, curved and shaped substantially the same as the curvature and shape of the sealing units of the sealer roll.

As hereinbefore stated, the material from which the bags are made is exceedingly difficult to cut, and can be successfully severed only after being pierced. To this end each cutter 105 is formed with a substantially V-shaped point 111 having diverging cutting edges 112 and 113. The point 111 is forced into the film at a position near the edge thereof, as shown by the dot and dash lines in Fig. 5, and this initial piercing is at such a position that the cutting edge 112 will sever the material from the point at which it is pierced outwardly to the edge thereof, after which the opposite cutting edge 113 will sever the remainder of the film, as the knife is drawn across the roll. The piercing operation is accomplished by the forward movement of the cutter bar 100 under the tension of the spring 102. This spring is placed under tension by means of the cam pin 106 as it rides upon the surface of a cam 114. This cam is stationarily secured to the frame of the machine and its surface 115 is eccentrically arranged with respect to the axis of the cutter head shaft 70, so that as the cutter head is moved in counterclockwise direction, as shown in Fig. 4, the cutter bar will be pushed upwardly into the outer section 82 of the cutter arm. The cam 114 is provided at its lower end with a stop lug 116 which engages the stop pin 106 at a position near the edge of the film 22 where it is to be pierced preliminarily to its being severed. After the stop pin 106 has reached the stop lug 116 of the cam, the upper and intermediate sections of the cutter arm will be pivoted about the hinge 83 against the tension of the spring 86, as shown by the double dot and dash lines of Fig. 4. The end of the cam 114 is formed on the advance side with a ledge 120, the upper surface of which is below the surface 115 of the cam, and the stop lug extends over this ledge so as to engage the stop pin when resting upon the ledge.

As the cutter arm is being moved to the position where the stop pin 106 engages the stop lug 116 of the cam 114, the guide flange 110 of the cutter roller 107 is moving toward the cam. The parts of the machine are so timed that the cutter arm will be bent to the double dot and dash line position of Fig. 4 when the end of the guide flange reaches the lower projecting end of the cutter bar 100. When so engaged, the cutter bar and outer section 82 of the cutter arm will be moved about the hinge 84 connecting it to the intermediate section. During this movement, the stop pin will be maintained in contact with the surface 115 of the cam by the axial movement of the cutter bar under the tension of the spring 102. As the cutter roll continues to revolve, the guide flange will now contact the end of the cutter bar and push the stop pin 106 off the surface 115 of the cam 114 and onto the ledge 120, which will allow limited downward movement of the cutter bar and cutter, thereby permitting the knife to pierce the film. The stop pin 106 is, however, still retained by engagement with the lug 116 but further rotation of the cutter roll will cause the stop pin to be pushed off of the ledge and beyond the restraining influence of the stop lug, whereupon the cutter arm will be free to rapidly swing across the cutter roll 107 and thereby sever the film. As the cutter is being drawn across the film, the spring 93 will serve to maintain the lower end of the cutter bar in engagement with the advance face of the curved guide flange 110, and the hinge 84 will permit further bending movement of the outer section to compensate for the rotative movement of the cutter roll during the cutting operation. The initial position of the parts just described is shown in full lines in Fig. 8; the intermediate position where the knife is permitted to pierce the film is shown in dot and dash lines, and the fully released position of the cutter arm is shown in double dot and dash lines. As shown in Fig. 8, the guide flange 110 is raised above the periphery of the cutter roll and is so positioned as to stretch the material tautly between the two clamping members 42 and 47 which greatly facilitates the piercing and cutting of the film material.

From the foregoing, it will be obvious that as the material is fed through the squeegee rolls 23 it is passed onto the sealer roll 30, and at predetermined points in the film the top and bottom walls thereof are sealed by the sealing means of this roll. The feeding of the film is accomplished by the clamping members 42 and 47 and the conveyor chains 43. These clamping members seize the edge of the film at opposite sides thereof, preferably at a point just ahead of the sealer roll by engagement with the closing cams 64 and 67. The clamps remain engaged with the film as it passes through the cooling chamber 33, the feed rolls 36, and on through the feed rolls 37 where they release the finished bag by contact with the opening cams 65 and 69. The feeding of the film is so timed that when each seal 41 approaches the cutter roll, the seal will be substantially over the top of one of the guiding flanges 110, whereby the material will be severed just in advance of the seal. After each bag has been formed and severed from the film material it will be carried to a place of discharge and be released at both ends simultaneously and dropped onto a receiving table or platform 79.

As hereinbefore stated, and as shown in Fig. 8, the film 22 is stretched tautly across the guide flanges 110 and between adjacent clamping members 42 and 47 so as to be more effectively pierced and severed by the cutter.

When the movable finger 54 of either of the clamping members 42 and 47 is in the position shown in Figs. 10 and 11, the tapered lug 61, bearing against the side wall of the recess 60, will, under tension of the spring 62, tend to further rotate the disc and thereby cause the fingers to tightly clasp the film material. Furthermore, when the movable finger 54 has been moved to the dot and dash line of Fig. 9, the lug will then engage the flat surface of the clamping disc 53 and be held in the open position until the actuating pin 63 or 68 is again brought into engagement with the associated closing cam 64 or 67.

As hereinbefore described, the piercing and cutting of the film material is very quickly accomplished by the sliding movement of the cutter bar and by the subsequent rapid swinging movement of the cutter.

Instead of releasing both ends of the finished bag simultaneously and dropping it upon a platform for subsequent disposal, it is obvious that a conveyor (not shown) may be employed. With such a conveyor belt the advance end of the bag would be released first and be dropped upon and carried forward by the belt, and the trailing end subsequently released, thereby depositing the entire bag upon the belt for conveyance to any desired place. These and other modifications may be made without departing from the spirit of my invention or the scope of the appended claims.

Having thus described my invention, what I claim is:

1. The combination with a machine for forming bags of plastic material having means for sealing the material at predetermined places, of cutting means, comprising a cutter roll in advance of the sealing means, a guide flange carried by and extending across the cutter roll, a cutter arm adjacent the cutter roll and movable across the periphery thereof, said arm being guided in its movement by said flange, and means carried by the arm for piercing and cutting the sealed material adjacent to and in advance of each seal to form individual bags.

2. The combination with a machine for forming bags of plastic material having means for sealing the material at predetermined places, of cutting means, comprising a cutter roll in advance of the sealing means, a hinged cutter arm movable across the periphery of the cutter roll, a guide flange carried by and extending across the cutter roll for guiding the cutter arm, and means carried by the arm for piercing and cutting the sealed material adjacent each seal to form individual bags.

3. The combination with a machine for forming bags of plastic material having means for sealing the material at predetermined places, of cutting means, comprising a cutter roll in advance of the sealing means, a guide flange carried by and extending across the cutter roll, a cutter arm adjacent the cutter roll and movable across the periphery thereof, said arm being guided in its movement by said flange, said arm having a jointed section for permitting angular movement thereof during sweeping motion of the arm, and means carried by the arm for piercing and cutting the sealed material adjacent to and in advance of each seal to form individual bags.

4. The combination with a machine for forming bags of plastic material having means for sealing the material at predetermined places, of cutting means, comprising a cutter roll in advance of the sealing means, a cutter arm carried by the machine and adapted to swing across the periphery of the cutter roll, a cutter carried by the arm, the arm consisting of an inner section, an intermediate section and an outer section, hinge means connecting the inner section and intermediate section for movement about an axis substantially parallel to the axis of swing of the arm, hinge means connecting the intermediate section and the outer section for movement about an axis substantially at right angles to the axis of swing to the arm, detent means engaging the cutter arm for causing the arm to be flexed at the hinge between the inner and intermediate sections, and means carried by the cutter roll for releasing the arm from the detent means to cause the film material to be pierced and cut across the cutter roll.

5. The combination with a machine for forming bags of plastic material having means for sealing the material at predetermined places, of cutting means, comprising a cutter roll in advance of the sealing means, a cutter arm carried by the machine and adapted to swing across the periphery of the cutter roll, a cutter carried by the arm, the arm consisting of an inner section, an intermediate section and an outer section, hinge means connecting the inner section and intermediate section for movement about an axis substantially parallel to the axis of swing of the arm, hinge means connecting the intermediatae section and the outer section for movement about an axis at substantially right angles to the axis of swing to the arm, a spring pressed cutter bar slidably disposed in the outer section of the arm, cam means carried by the machine for forcing the cutter pin into the outer section of the arm, detent means carried by the cam for causing the arm to be fixed at the hinge between the inner and intermediate sections, and means carried by the cutter roll for releasing the arm from the detent means to cause the film material to be pierced and cut across the cutter roll.

6. The combination with a machine for forming bags of plastic material having means for sealing the material at predetermined places, of cutting means, comprising a cutter roll in advance of the sealing means, a cutter arm carried by the machine and adapted to swing across the periphery of the cutter roll, the arm consisting of a number of sections, hinge means connecting the adjacent sections for limited angular movement, the hinge means at opposite ends of one of the sections being arranged to position their axes at right angles to each other, a cutter pin carried by the cutter arm, cam means carried by the machine for placing the cutter pin under spring tension, detent means carried by the cam for causing the sections to be flexed at the hinge means connecting them together and a curve-shaped guide flange carried by the cutter roll for releasing the arm from the detent means and for guiding it across the cutter roll.

7. The combination with a machine for forming bags of plastic material having means for sealing the material at predetermined places, of cutting means, comprising a cutter roll in advance of the sealing means, a hinged cutter arm movable across the periphery of the cutter roll, a curve-shaped guide flange carried by and extending across the cutter roll for guiding the cutter arm in a curved path, and detent means engaging the cutter arm immediately preceding the cutting stroke to flex the arm at the hinged joint, and means for releasing the arm from the detent means and allowing it to be swept across the material to sever the same.

8. The combination with a machine for forming bags of plastic material having means for sealing the material at predetermined places, of cutting means, comprising a cutter roll in advance of the sealing means, a hinged cutter arm for sweeping movement across the periphery of the cutter roll, a cutter cam for cooperation with the cutter arm, detent means carried by the cam for engagement with the cutter arm at cam surface level, a ledge carried by the cam for engagement by the arm when released from the cam surface, and means carried by the cutter roll for engagement with the cutter arm to release the arm initially from the cam surface and finally from the ledge and the detent means, whereby the material will be initially pierced and then severed by the cutter arm.

9. The combination with a machine for forming bags of plastic material having means for sealing the material at predetermined places, of cutting means, comprising a cutter roll in advance of the sealing means, a hinged cutter arm for sweeping movement across the periphery of the cutter roll, a cutter cam, a cam pin carried by the arm for cooperation therewith, detent means carried by the cam for engagement with the cam pin at cam surface level, a ledge carried by the cam for engagement with the cam pin when released from the cam surface, and means carried by the cutter roll for engagement with the cutter arm to release the cam pin initially from the cam surface and finally from the ledge and the detent means, whereby the material will be initially pierced and then severed by the cutter arm.

10. The combination with a machine for forming bags of plastic material having means for sealing the material at predetermined places, of cutting means, comprising a cutter roll in advance of the sealing means, a hinged cutter arm for sweeping movement across the periphery of the cutter roll, a cutter cam, a cam pin carried by the cutter arm for cooperation with the cam, a cam ledge formed at the lower end of the cam and having its surface below the surface of the cam, a stop lug extending across the end of the cam and the ledge for engagement by the stop pin, and a guide flange carried by the cutter roll for engagement with the cutter arm to release the arm initially from the surface of the cam and finally from the ledge and the detent means, whereby the material will be initially pierced and then severed by the cutter arm.

11. The combination with a machine for forming bags of plastic material having means for sealing the material at predetermined places, of cutting means, comprising a cutter roll in advance of the sealing means, a cutter arm carried by the machine and adapted to swing across the periphery of the cutter, a cutter carried by the arm, the arm consisting of an inner section, an intermediate section and an outer section, hinge means connecting the inner section and intermediate section for movement about an axis substantially parallel to the axis of swing of the arm, hinge means connecting the intermediate section and the outer section for movement about the axis substantially at right angles to the axis of swing to the arm to permit these sections to be flexed at the hinge joint between them to compensate for the rotation movement of the cutter roll, a cutter cam for engagement with the end of the outer section of the arm to cause the arm to be flexed at the hinge between the inner and intermediate sections, a stop carried by the cam for temporarily restraining movement of the outer end of the outer section, and a guide flange carried by the cutter roll for engagement with the cutter arm to release it from the stop and permit it to swing across the cutter roll to sever the material.

12. The combination with a machine for forming bags of plastic material having means for sealing the material at predetermined places, of cutting means, comprising a cutter roll in advance of the sealing means, a cutter arm carried by the machine and adapted to swing across the periphery of the cutter roll, a cutter carried by the arm, the arm consisting of an inner section, an intermediate section and an outer section, hinge means connecting the inner section and intermediate section for movement about an axis substantially parallel to the axis of swing of the arm, hinge means connecting the intermediate section and the outer section for movement about an axis substantially at right angles to the axis of swing to the arm, spring tension means for normally maintaining the arm sections in alignment with one another, detent means engaging the cutter arm for causing the arm to be flexed at the hinge between the inner and intermediate sections, and means carried by the cutter roll for releasing the arm from the detent means to cause the film material to be pierced and cut across the cutter roll.

13. The combination with a machine for forming bags of plastic material having means for sealing the material at predetermined places, of cutting means, comprising a cutter roll in advance of the sealing means, a cutter arm carried by the machine and adapted to swing across the periphery of the cutter, a cutter carried by the arm, the arm consisting of an inner section, an intermediate section and an outer section, hinge means connecting the inner section and intermediate section for movement about an axis substantially parallel to the axis of swing of the arm, hinge means connecting the intermediate section and the outer section for movement about the axis substantially at right angles to the axis of swing to the arm, a reciprocating cutter bar carried by the outer section, a cam pin carried by the bar, a cutter cam for cooperation with the cam pin for compressing the bar and flexing the inner and intermediate sections, detent means carried by the cam for engagement with the cam pin for temporarily restraining movement of the cutter arm, and a guide flange carried by the cutter roll for releasing the arm from the detent means for movement across the cutter roll to sever the material.

References Cited in the file of this patent

UNITED STATES PATENTS

| Number | Name | Date |
|---|---|---|
| 1,143,672 | Weiss et al. | June 22, 1915 |
| 1,571,983 | Weber | Feb. 9, 1926 |
| 1,690,626 | Duvall | Nov. 6, 1928 |
| 2,099,314 | Potdevin | Nov. 16, 1937 |
| 2,336,957 | Pierce | Dec. 14, 1943 |
| 2,435,560 | Richens | Feb. 3, 1948 |
| 2,444,685 | Waters | July 6, 1948 |